United States Patent [19]
Newell

[11] 3,865,500
[45] Feb. 11, 1975

[54] LOCKING HANDLE

[76] Inventor: E. Strohm Newell, 2350 6th Ave., San Diego, Calif. 92101

[22] Filed: July 9, 1973

[21] Appl. No.: 377,694

[52] U.S. Cl. ............. 403/359, 16/114 R, 64/27 CS, 81/72, 279/102, 403/377, 403/320
[51] Int. Cl. ................................................ F16d 1/10
[58] Field of Search ...... 74/545, 546, 548; 403/359; 292/348, 352, 354; 81/71, 72; 64/7, 9 R, 14, 23 R, 27 CS, 27 R; 279/9, 102; 192/70.2; 16/114 R

[56] References Cited
UNITED STATES PATENTS

| | | | |
|---|---|---|---|
| 2,797,599 | 7/1957 | McGarvie, Jr. | 81/71 |
| 3,167,338 | 1/1965 | Troike | 403/354 |
| 3,575,015 | 4/1971 | Geisthoff et al. | 64/23 |
| 3,733,937 | 5/1973 | Mezey | 81/71 |

*Primary Examiner*—Jordan Franklin
*Assistant Examiner*—Conrad L. Berman
*Attorney, Agent, or Firm*—Markva & Smith

[57] ABSTRACT

A locking handle is used in combination with a hub portion. The locking handle comprises a shaft locking member having a lower portion and a fixed upper portion. The lower portion is movable with respect to the fixed upper portion. At least one spline member is disposed on the upper portion and the lower portion. Each of the upper and lower portions includes a mating surface having an inclined surface portion. Biasing means is used to urge the mating surfaces of the upper and lower portions together whereby the spline members on the upper and lower portions are out of alignment with respect to each other when the handle is not engaged with the hub portion. When the shaft locking member is placed into the female member of the hub portion, the spline members on the upper and lower portions are in alignment with respect to each other and the biasing force of the biasing means is transmitted to the hub portion thereby holding the handle in place.

21 Claims, 6 Drawing Figures

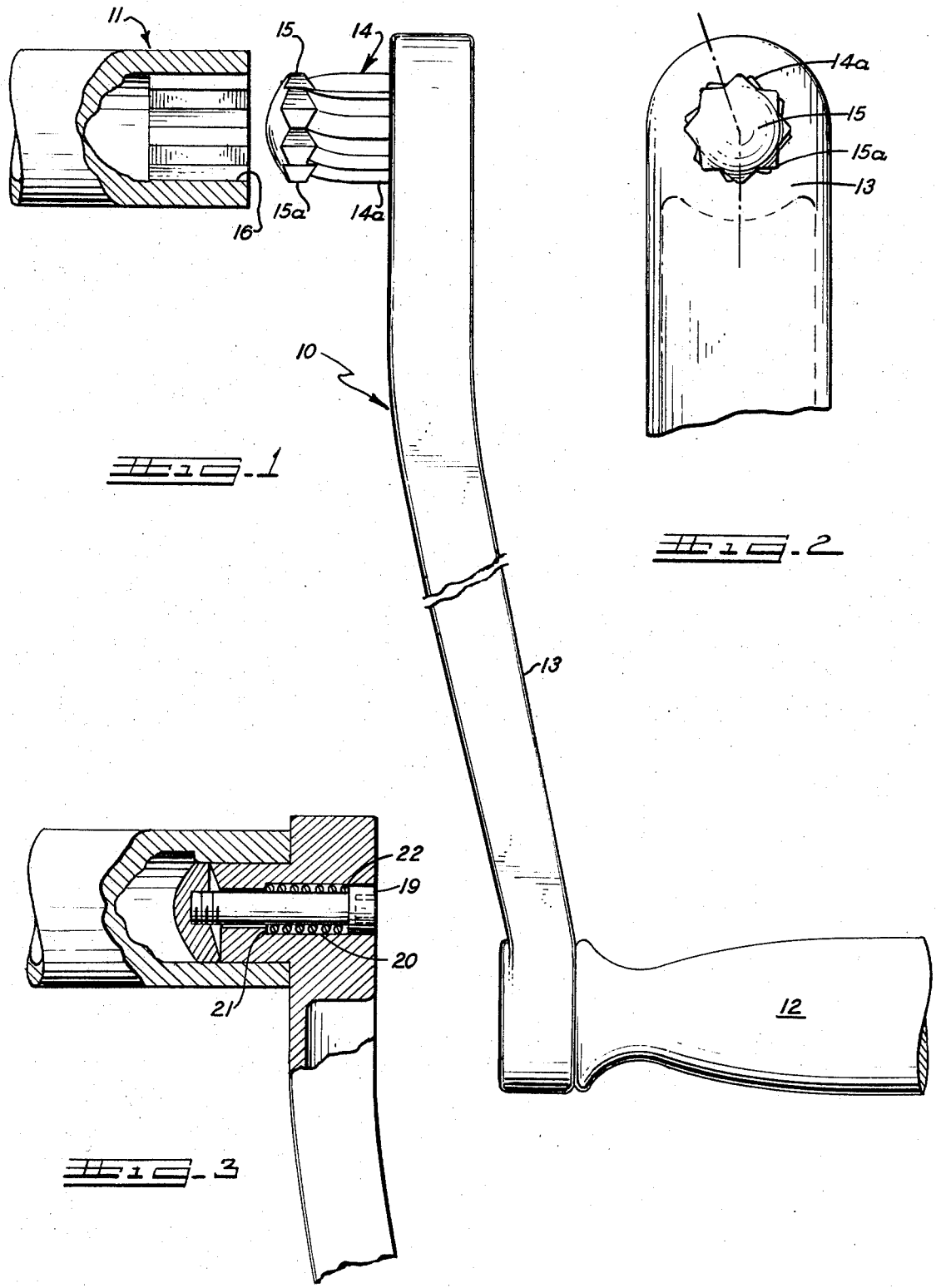

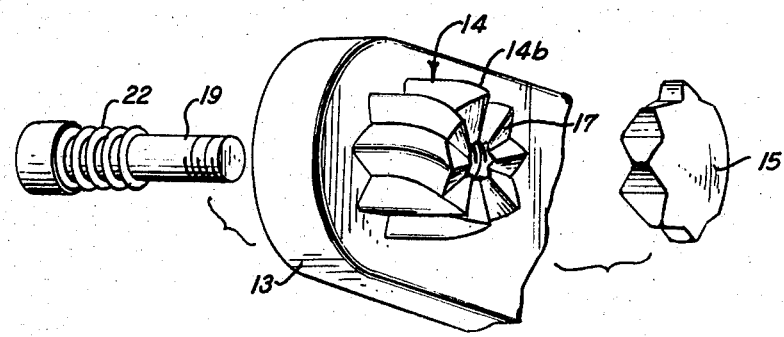
FIG. 4
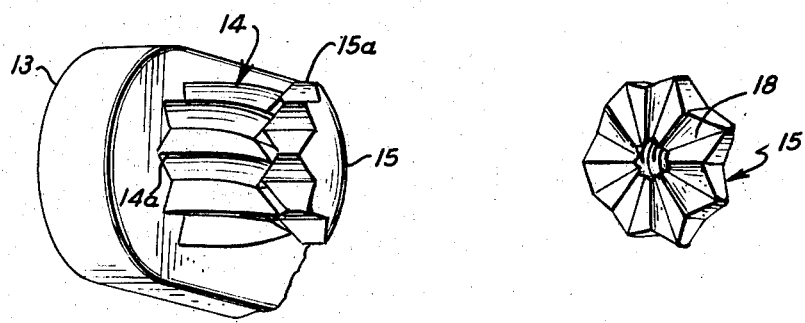
FIG. 5
FIG. 6

LOCKING HANDLE

BACKGROUND OF THE INVENTION

This invention relates to rod joints or couplings wherein there is a shaft end attached. These joints or couplings are used in conjunction with shaft and hub assemblies.

The use of various types of shaft end configurations for connecting handles into a hub portion is well known. These prior art configurations are used with hand operated assemblies and include locking mechanisms for attaching shafts which carry handles to a part that is to be turned.

The use of splines on the end of the shafts in connecting a hub member is well known. It is known to use spline material made of resilient material so that the splines deform. Here a basic disadvantage is that the material itself is subject to breakage and is more likely to wear out over an extended period of time.

It is further known to use separate connecting elements which are releasably placed on the shaft end for the purpose of holding the shaft in contact with the female member. These separate elements are generally resilient in nature or have a spring configuration. Here again, there is the disadvantage of losing the additional spring element or having it wear out over an extended period of use.

More specifically, the invention is related to obtaining a locking handle for a deck winch which will stay in place when the boat tips but can be pushed in or pulled out instantly by hand. Presently, deck winch handles are either free floating in the winch hub or are locked in place. The free floating type of deck winch handle is usually lost overboard. That is, it either falls out by itself or is dropped when being removed. When a handle comes out easily, there is a tendency not to grip it too tightly and consequently it is very often dropped.

The locking type of deck winch handle has to be locked by manipulating a lever. These are very expensive to make and cumbersome to lock and unlock. The locking type of deck winch handle must have a custom fit winch hub portion. Furthermore, this type of locking winch handle is unsafe because it cannot be pulled out quickly in case of a fouled line.

PURPOSE OF THE INVENTION

The primary object of this invention is to provide a locking handle which may be used in combination with a hub portion and may be pushed in or pulled out instantly but will stay in place until it is pulled out.

A further object of the invention is to provide a shaft and hub assembly for holding a locking handle in place until such time that it is desired to be removed by pulling same manually from the hub portion.

Another object of this invention is to provide a locking handle which may be fitted into any standard type of hub portion such as a winch handle as placed into a standard type of winch hub member.

A still further object of the invention is to provide a deck winch handle for any standard deck winch.

SUMMARY OF THE INVENTION

These objects and other advantages are accomplished through the use of the shaft and hub assembly made as disclosed herein. The locking handle has a shaft locking member made in two parts. A lower portion is movably mounted onto a fixed upper portion. The lower and upper portions include mating surfaces having inclined surface portions or a plurality of surface sections, which are in contact through the use of a biasing mechanism. At least one spline member is disposed on the upper portion and at least one spline member is on the lower locking element.

When the locking shaft member is out of engagement with the female member of the hub portion, the spline member on the upper portion is out of alignment with respect to the spline member on the lower locking element or portion. Once the shaft locking member is placed into the female member of the hub portion, the spline members on the upper and lower portion are in alignment with respect to each other and a torsional force is transmitted to the inner surface of the female member thus holding the handle in place with respect to the hub portion.

The mating surfaces located on the upper portion and the lower portion include a plurality of surface sections each inclined at the same angle with respect to a plane which is normal to the longitudinal axis of the shaft locking member. The inclined surface sections have a total area sufficient to maintain mating contact between the upper and lower portions when the spline member on the upper portion is in alignment with the spline member of the lower portion.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 1 is a fragmentary side elevational view partially in section of a hub assembly made in accordance with this invention, FIG. 2 is a fragmentary elevational view of a locking handle as shown in FIG. 1, FIG. 3 is a fragmentary cross-sectional view of a locking handle mated with a hub portion as shown in the assembly of FIG. 1, FIG. 4 is an exploded perspective view of the end of handle member of FIG. 1, FIG. 5 is a fragmentary perspective view of the locking mechanism with the spline members in alignment, and FIG. 6. is a perspective view of the lower locking element showing the mating surface used in conjunction with a fixed upper portion of the locking shaft member.

DESCRIPTION OF SPECIFIC EMBODIMENTS

More specifically, referring to the drawings, the locking handle, generally designated 10, is used in combination with the hub portion, generally designated 11, to form a shaft and hub assembly. The handle 10 includes a hand piece 12 disposed at one end of the lever 13 and a locking shaft mechanism having a fixed upper portion 14 located at the other end of the lever 13. The locking shaft mechanism or member also has a lower locking element 15 which is movable with respect to the fixed upper portion 14.

A plurality of spline members 14a are located on the upper portion 14 and spline members 15a are located on the lower locking element 15. The spline members 14a and 15a are adapted to fit into the female member 16 of the hub portion 11.

The fixed upper locking element 14 includes a plurality of inclined surface sections 17 each of which are inclined at the same angle with respect to a plane which is normal to the longitudinal axis of the shaft locking member. The lower locking element 15 also includes inclined surface sections 18 which are inclined at an acute angle with respect to a plane which is normal to the longitudinal axis of the shaft locking member. The surface sections 17 and 18 form respective mating surfaces on the fixed upper locking portion 14 and lower locking element 15 as shown in FIGS. 4 through 6.

As shown in FIG. 3, a biasing mechanism is used to urge the mating surfaces of the upper and lower portions together. The biasing mechanism includes a screw 19 which is threaded and screwed tightly into the bottom locking portion or element 15. That is, the screw 10 bottoms out in the locking element 15. A bore 20 extends through the lever 13 and along the longitudinal axis of the upper locking element 14. A shoulder 21 is disposed intermediate the ends of the upper locking element 14 and a coil spring member 22 is disposed around the shaft of the screw 19. One end of the spring member 22 is contiguous to the head portion of the screw 19 and the other end of the spring 22 is contiguous to the shoulder 21. Thus, the spring means 22 acts on the screw member 19 to urge the lower locking element or portion 15 into positive engagement with the upper portion 14.

In this specific embodiment, the inclined surface sections 17 and 18 are at an angle of about 45° with respect to a plane that is normal to the longitudinal axis of the shaft locking member. The inclined surface portions have an area sufficient to maintain the mating contact between the upper portion 14 and lower portion 15 when the spline members 14a on the upper portion 14 are in alignment with the spline members 15a of the lower locking element 15 as shown in FIG. 5. There is an opening between the mating surface of the upper portion 14 and the mating surface of the lower locking element 15 when the splines 14a and 15a are in alignment. The spline alignment occurs when the locking shaft member is disposed within the female member 16 of the hub portion 11. That is, as the splines 14a and 15a are received into the grooves of the female member 16, the locking element 15 twists or rotates and creates more tension within the spring 22 as shown in FIG. 3. In essence, a rotary locking occurs inasmuch as the spline surfaces along the periphery of the locking element 15 are pushing against the inside surface of the female member 16. In other words, the lower locking portion 15 is effective to transmit a biasing force to the hub portion 11 via the spline member 15a so that the handle is held in place within the hub portion.

This particular embodiment is directed to a winch handle which is used with a standard hub or winch body 11. The splines 14a located on the upper portion 14 include a lead-in section 14b. This lead-in section constitutes a cam surface which allows the locking shaft member to be pushed forwardly into the female member 16 of the standard winch hub 11. It is necessary to have the lead-in sections 14b because just before insertion, the spline members 15a of the locking element 15 are offset or out of alignment with respect to the spline members 14a on the upper portion 14.

As shown in FIG. 1, just before the shaft locking member is placed into the female opening 16, the mating surfaces of the fixed upper portion 14 and lower locking element 15 are intermeshed. Upon placing the locking shaft member into the grooved female member 16, the locking element 15 turns with respect to the upper portion 14 which is allowed to enter the female member 16 by virtue of the camming action of the lead-in sections 14b located at the end of the upper portion 14 adjacent the lower locking element or portion 15. The locking element 15 of this embodiment has eight splines 14a with a matching number of splines 15a located on the lower locking element 15. It is contemplated that a fewer or greater number of ribs or splines may be used to effectuate the desired results set forth and claimed in the instant case.

The method of making the assembly of this invention is very simple. All of the parts associated in this assembly may be cast. The lower locking element 15 has a hole bored therein and tapped to receive the end of the threaded screw 19. The screw 19 and spring 22 may be composed of stainless steel. Once the locking shaft member is placed into the hub portion 11, will require a force greater than the weight of the handle itself to remove it. This prevents the winch handle 10 from falling out once it has been placed in the winch hub 11. The locking element 15 is engaged with the female member 16 along the periphery of the shaft locking mechanism.

While the locking handle has been shown and described in detail, it is obvious that this invention is not to be considered as being limited to the exact form disclosed, and that changes in detail and constructions may be made therein within the scope of the invention, without departing from the spirit thereof.

Having thus set forth and disclosed the nature of this invention, what is claimed is:

1. A locking handle for turning a hub portion comprising:
   a. a shaft locking member engageable with the hub portion and including a lower portion and a fixed upper portion,
   b. said lower portion being movable with respect to the fixed upper portion,
   c. at least one spline member disposed on the upper portion and the lower portion,
   d. said upper portion and said lower portion each including a mating surface having an inclined surface portion, and
   e. biasing means having a biasing force which urges the mating surfaces of the upper and lower portions together to cause the spline members on the upper and lower portions to be out of alignment with respect to each other when the handle is not engaged with the hub portion,
   f. the spline member of the lower portion being effective to transmit said biasing force to the hub portion.

2. A locking handle as defined in claim 1 wherein the spline member on the upper portion includes a lead-in section at the end of the upper portion disposed adjacent the lower portion.

3. A locking handle as defined in claim 1 wherein the inclined surface portions are at an acute angle with respect to a plane which is normal to the longitudinal axis of the shaft locking member.

4. A locking handle as defined in claim 1 wherein the inclined surface portions have an area sufficient to maintain mating contact between the upper and lower portions when the spline member on the upper portion is in alignment with the spline member of the lower portion.

5. A locking handle as defined in claim 4 wherein said inclined surface portion includes a plurality of surface sections each inclined at the same angle with respect to a plane which is normal to the longitudinal axis of the shaft locking member.

6. A locking handle as defined in claim 5 wherein there is a plurality of spline members on the upper and lower portions, each of the spline members on the upper portion includes a lead-in section extending from the end of the upper portion adjacent the lower portion.

7. A locking handle as defined in claim 1 wherein said biasing means includes a screw member tightly screwed into the lower portion and spring means acting on the screw member to urge the lower portion into positive engagement with the upper portion.

8. A locking handle as defined in claim 7 wherein the screw member has a shaft and a head portion and extends through a bore in said upper portion along the longitudinal axis of the locking member, said bore includes a shoulder disposed intermediate the ends of said upper portion, the spring means include a coil spring member disposed around the shaft, and said spring member has one end thereof contiguous to the head portion of the screw and the other end thereof contiguous to said shoulder.

9. In an assembly having a handle and hub portion, the combination comprising:
a. a shaft locking member located at the end of a handle shaft and including a lower portion and a fixed upper portion,
b. said lower portion being movable with respect to the fixed upper portion,
c. said hub portion including a female member for receiving said shaft locking member,
d. at least one spline member disposed on the upper portion and the lower portion and each being adapted to fit into said female member,
e. said upper portion and said lower portion each including a mating surface having an inclined surface portion, and
f. biasing means having a biasing force which urges the mating surface of the upper and lower portions together to cause the spline members on the upper and lower portions to be out of alignment with respect to each other when the handle is not engaged with the hub portion and to cause said spline members to be in alignment when the shaft locking member is engaged with the female member of the hub portion so that the spline member of the lower portion transmits said biasing force to the female member.

10. The combination as defined in claim 9 wherein the inclined surface portions are at an acute angle with respect to a plane which is normal to the longitudinal axis of the shaft locking member.

11. The combination as defined in claim 9 wherein the inclined surface portions have an area sufficient to maintain mating contact between the upper and lower portions when the spline member on the upper portion is in alignment with the spline member of the lower portion.

12. The combination as defined in claim 11 wherein the inclined surface portion includes a plurality of surface sections each inclined at the same angle with respect to a plane which is normal to the longitudinal axis of the shaft locking member.

13. The combination as defined in claim 12 wherein there is a plurality of spline members on the upper portion and the lower portion and each of the spline members on the upper portion includes a lead-in section extending from the end of the upper portion which is adjacent to the lower portion.

14. The combination as defined in claim 9 wherein said biasing means includes a screw member tightly screwed into the lower portion and spring means acting on the screw member to urge the lower portion into positive engagement with the upper portion.

15. The combination as defined in claim 14 wherein the screw member has a shaft and a head portion and extends through a bore in said upper portion along the longitudinal axis of the locking member, said bore includes a shoulder disposed intermediate the ends of said upper portion, said spring means includes a coil spring member disposed around the shaft, and said spring member has one end thereof contiguous to the head portion of the screw and the other end thereof contiguous to said shoulder.

16. A shaft end locking mechanism for retaining a shaft in a female member of a hub portion, said mechanism comprising:
a. a fixed portion and a retainer portion movably disposed with respect to the fixed upper portion,
b. at least one spline member disposed on the fixed portion and the retainer portion,
c. said fixed portion and said retainer portion each including a mating surface having an inclined surface portion, and
d. biasing means having a biasing force which urges the mating surfaces of the fixed and retainer portions together,
e. the spline member of the retainer portion being effective to transmit said biasing force to the hub portion.

17. A shaft end locking mechanism as defined in claim 16 wherein the fixed portion is an upper portion and the retainer is a lower portion.

18. A shaft end locking mechanism as defined in claim 17 wherein there is a plurality of spline members on the upper and lower portions, each of the spline members on the upper portion includes a lead-in section extending from the end of the upper portion adjacent the lower portion.

19. A shaft end locking mechanism as defined in claim 16 wherein the inclined surface portions are at an acute angle with respect to a plane which is normal to the longitudinal axis of the shaft locking member.

20. A shaft end locking mechanism as defined in claim 16 wherein the inclined surface portions have an area sufficient to maintain contact between the fixed and retainer portions when the spline member on the fixed portion is in alignment with the spline member of the retainer portion.

21. A shaft end locking mechanism as defined in claim 20 wherein said inclined surface portion includes a plurality of surface sections each inclined at the same angle with respect to a plane which is normal to the longitudinal axis of the shaft locking member.

* * * * *